April 14, 1931.  H. M. H. REUFEL ET AL  1,801,108
FILAMENT SUPPORT MAKING AND INSERTING MACHINE
Original Filed Feb. 25, 1925   5 Sheets-Sheet 4
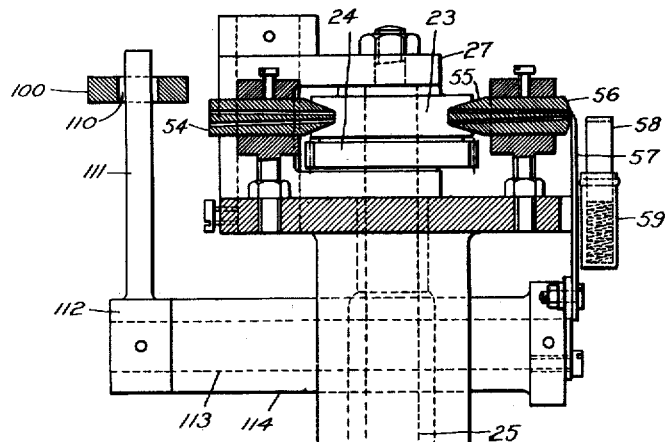
Fig. 6.
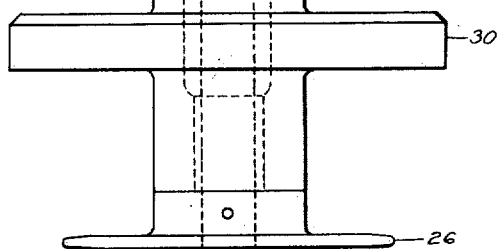
Fig. 7.
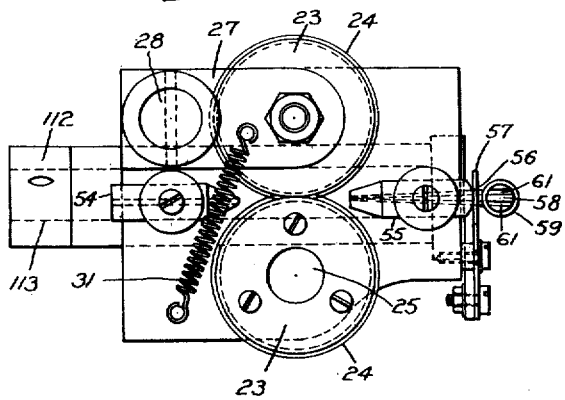
Fig. 8.
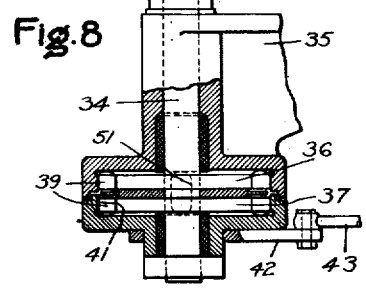
Inventors:
Hendrik de Jong,
Heinrich M.H. Reufel,
Willem G.F. Wentink,
by *Alexander S. Lunt*
Their Attorney.

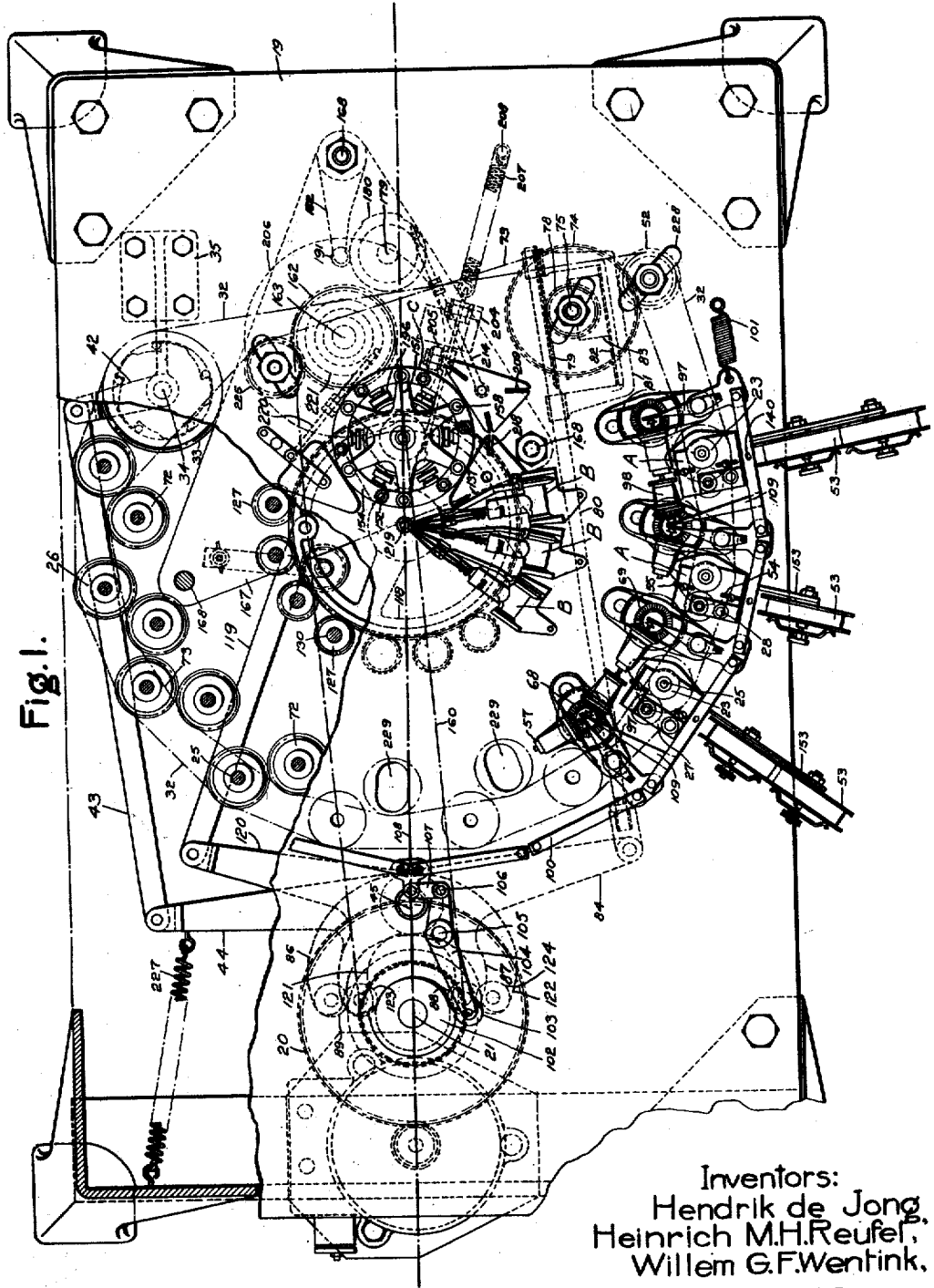

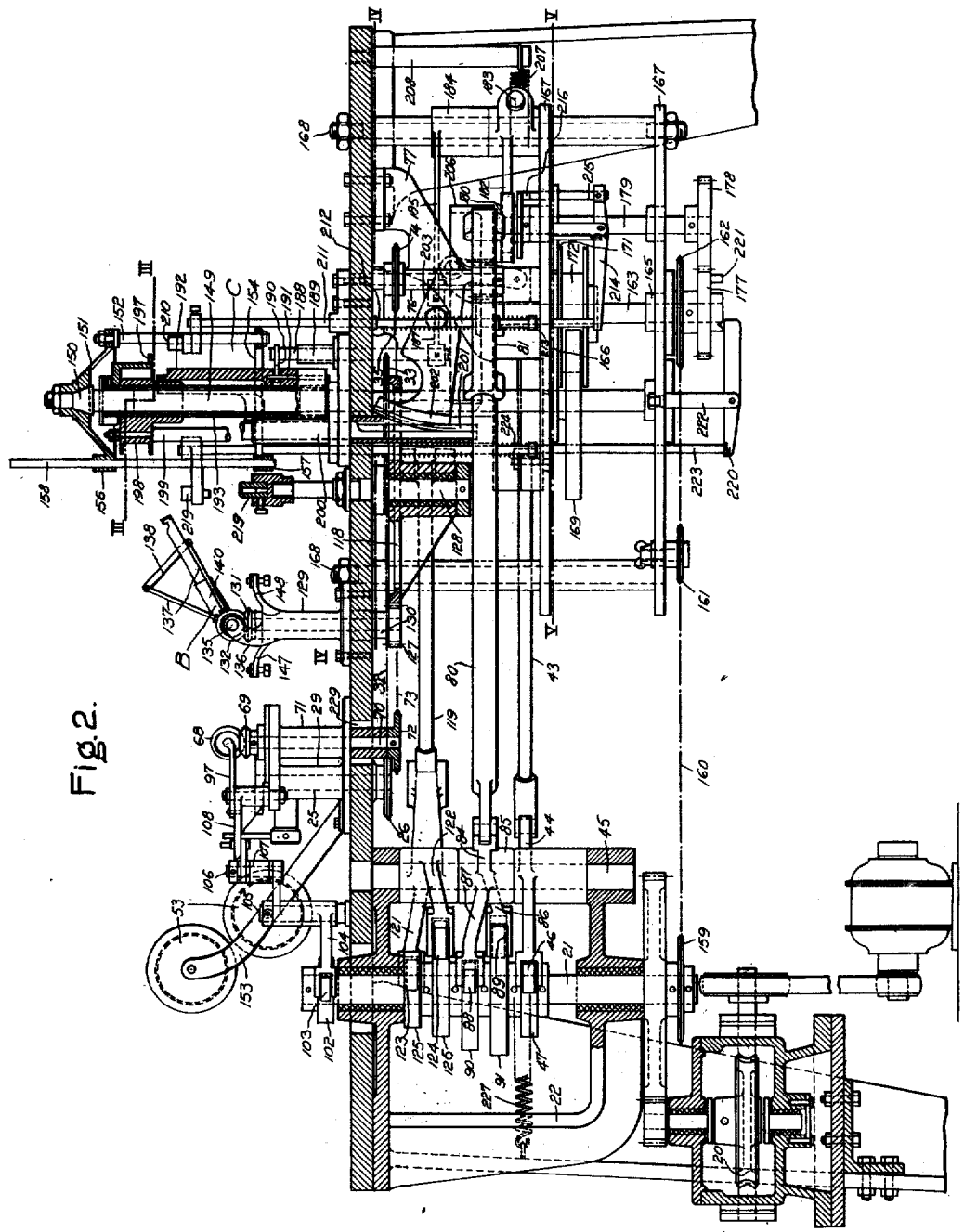

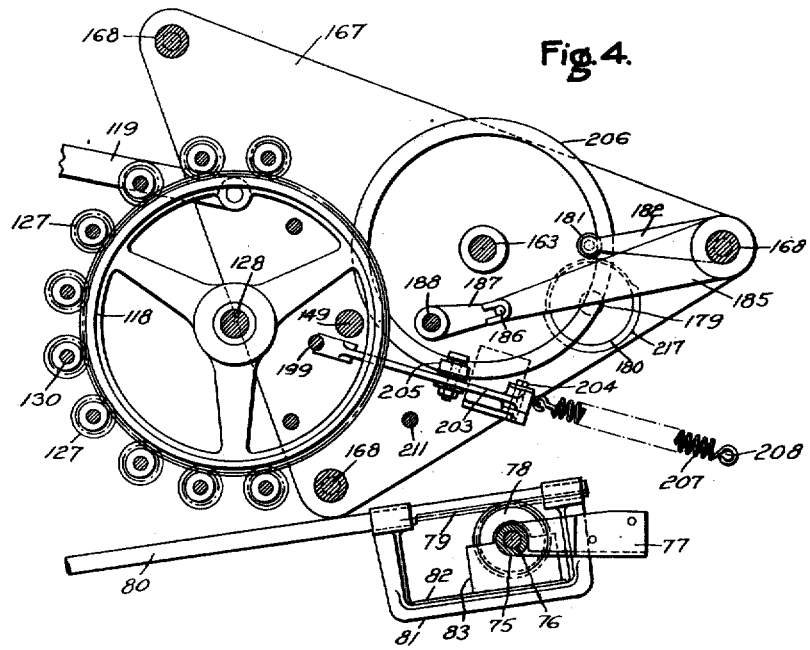
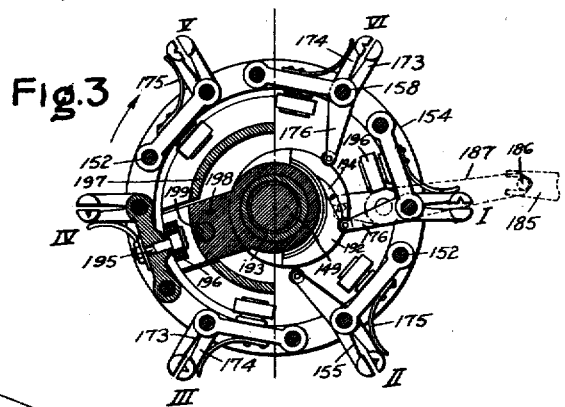
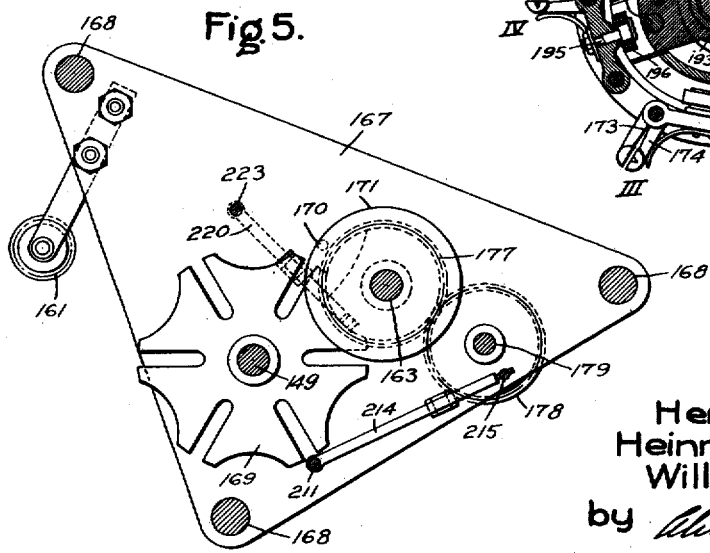

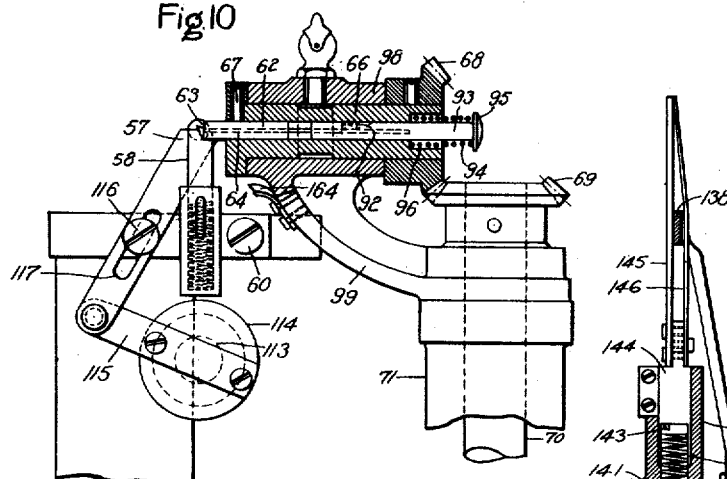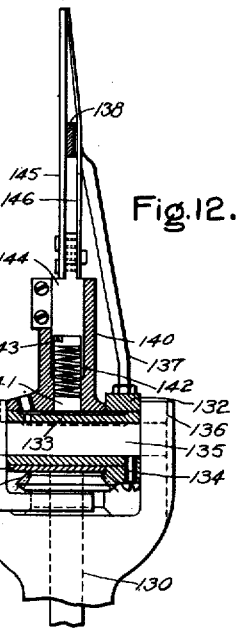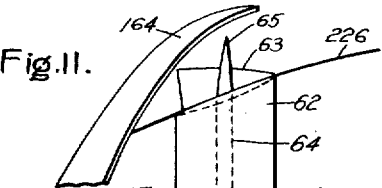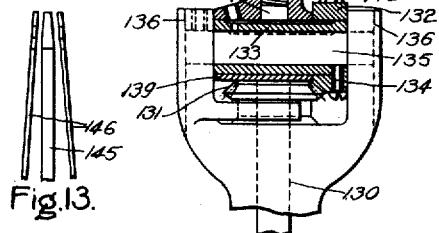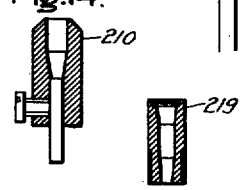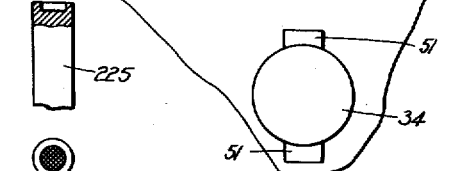

Patented Apr. 14, 1931

1,801,108

UNITED STATES PATENT OFFICE

HEINRICH MARTIN HUBERT REUFEL AND HENDRIK DE JONG, OF EINDHOVEN, AND WILLEM GUSTAAF FREDERIK WENTINK, OF THE HAGUE, NETHERLANDS, ASSIGNORS TO GENERAL ELECTRIC COMPANY, A CORPORATION OF NEW YORK

FILAMENT SUPPORT MAKING AND INSERTING MACHINES

Application filed February 25, 1925, Serial No. 11,505, and in the Netherlands March 6, 1924. Renewed August 22, 1929.

This invention relates to a machine for shaping filament supports and for inserting these supports in glass rods for use in incandescent lamps and other electrical apparatus. It should be kept in mind that in the manufacture of incandescent lamps the filament is carried by a glass rod or hub fused to the anchors or stem before the filament supports are inserted, the leading-in wires being sealed through the stem. The invention more particularly relates to the shaping of filament supports having an eye in one end and the inserting of them in glass rods. This kind of a filament support is often called an eye support, and a number of them are embedded either in the top button or the bottom button or in both buttons of the glass rod or hub. The top button is the enlargement on the end of the glass rod and the bottom button is the enlargement near the end where the rod is joined to the stem.

When in this specification the word glass rod is used it includes also a tube, which may be used instead of a rod in some cases.

Machines for shaping and inserting filament supports are already known, such as for instance, the machine shown in U. S. patent to Frech and Fagan No. 1,220,386, March 27, 1917, which inserts the supports one after another and which shapes the anchor eyes after the support is inserted.

According to the present invention the machine is equipped with an anchor shaping mechanism for making the anchors or filament supports, and with a transfer device that takes the shaped anchors out of this mechanism and carries them to a central inserting position. In addition, there may be a device for heating the glass rods and carrying them to the inserting position.

One object of this invention is to provide a machine that will shape a number of filament supports and then insert the shaped filament supports in the glass rod with accuracy and at very great speed.

To this end the invention provides a number of anchor shaping mechanisms for making the filament supports and a number of transfer devices that pick up the supports and carry them to a common central inserting position. The shaping mechanisms for making the supports can be so constructed that the supports after being shaped are transferred and placed radially about a central inserting position.

Machines that make filament supports from a wire which is not cut to the required length beforehand, and that are provided with a device for moving the wire to insert it sometimes permit the wire, especially when it is thin, to slip more or less when it is being moved so that the wire does not penetrate always to the same depth into the top or bottom button when the insertion takes place. To overcome this difficulty this invention provides devices that pick up the finished anchors and carry them in such a way that the ends just cut from the supply wire come into the inserting position. This assures that the extent to which the support is embedded in the button is independent of any slip when inserting the wire.

A suitable form of these transfer devices or "picking-up" devices for practicing this invention may consist of one or more sets of fingers, each set rotating around a fixed axis and taking the supports to the inserting position. According to the invention, these sets of fingers can also be made to move, each one individually about a common center in a radial vertical plane. To allow a greater number of filament supports to be inserted at the same time, one or more of the sets of fingers may be made to handle two supports at the same time.

To make the inserting of filament supports of different lengths possible and, at the same time, to keep constant the distance which they are inserted, the set or sets of fingers can be adjustably attached to arms. A suitable form for the holder is a pair of spring fingers pressed together by their own elasticity, or one finger can be made nonflexible and the other finger or fingers resiliently pressed against it. The non-flexible finger of a set can be provided with a jaw of such a form that this set positions the filament supports radially in the inserting position. For controlling the opening and closing movement of the fingers a small wedge may be provided between every pair of fingers. This wedge is firmly fixed on the shaft of the arm, whereas the arm itself is moved only by its friction with the shaft. In a suitable form, according to the invention, a stop prevents the motion of the arm or arms during part of the rotation of the shaft and the wedge.

The mechanisms for making the filament supports will generally consist of wire feed devices for periodically advancing the wire on which the "eye" is to be formed, shapers for bending the end of the wire and thus forming the "eye", and cutters for cutting the newly formed eye-support off the wire supply. Usually the wire is fed forward by a set of jaws which open when moving back, but such a feed has the drawback, especially with thin wire, that the danger of slipping is great. According to this invention, the slipping of the wire is prevented by feeding the wire by rolls that press each other continuously and rotate intermittently. This intermittent rotation, which has to take place very accurately, can be derived, accordingly to the invention, by means of a one-way clutch from a part of the machine that moves forward and backward. This clutch may consist of a number of rollers that are caught between the wall of a cup and a coupling disk, in one direction of rotation. In order to make the intermittent rotation of the rollers very accurate, the invention also provides a catch between the intermittently rotating part of the drive and the fixed machine bed or frame. A roller coupling is to be preferred for this catch, which prevents the possibility of the first rollers jamming and taking the feed rolls along when moving backward. To prevent any slip at all in the clutch it is recommended to yieldingly hold the clutch rollers in contact with the wall of the cup and the coupling disk by means of spring pressed buffers.

For leveling the wires up when moving and also for keeping them in the right position when they are picked up by the transfer fingers that carry them to the central inserting position, the invention provides a guide for the wire between the place where it is cut and the place where the end is bent into an eye. In order to facilitate the picking up, the guide may be supported by springs and the fingers of the carrier may be used to press it away from the wire.

Each eye-shaping mechanism has a guide plate which guides the end of the wire. According to the invention, the "eyes" can be shaped around a pin by means of a roll that can rotate around the axis of the pin. The pin can be made to move lengthwise. Moreover the pins in several eye-shaping mechanisms may be made to move by one single cam. In a practical form of the invention, the pins of the various eye-shaping mechanisms are actuated by a number of levers coupled together by a number of links.

It is important that the eye supports be cut at the moment that the pin is removed from the surface of the newly formed eye. For this purpose, according to the invention, the driving mechanisms of the pin and the cutting knife are coupled together. The cutting devices can be actuated by levers that are moved by the above mentioned links.

Each mechanism for shaping of "eyes" can be made double and arranged to make two eyes simultaneously, by providing two symmetrical or almost symmetrical eye-shaping devices. Both wires in such a double mechanism may be made to move with advantage by one pair of feed rolls, and two separate holes for wires must be provided in the cutting member of the double mechanism.

After having been bent around the pin by the shaping roll the eye supports are elastic. This is a drawback for bringing the eye supports in the right position when they are picked up. The invention meets this drawback by having the shaping roll turn back over at least the same angle as that over which the eye support springs back on account of its own elasticity.

For making the eye support of the required length, it is the usual practice to have the cutting mechanism adjustable. This cannot be done in a machine embodying the invention, for it would cause a wrong position of the eye supports with regard to the glass rod. Therefore, the invention makes the device or devices for shaping of the eyes bodily adjustable with reference to the cutting mechanism or mechanisms.

It often occurs that the speed of machines, in which the heating of glass rods is a part of the process, is limited because the glass can be heated to the required temperature only at a certain speed. This temperature, however, can be low when the deformation remains small. Therefore, the invention provides devices for molding the glass rods in more than one position. On every glass rod there can be molded two or more buttons, and the button or buttons in which the "eye supports" are to be fused, can be molded in more than one position. More buttons are very often required when the "getter" is used for purifying the gas filling or improving the vacuum of incandescent lamps. This "getter" is often applied on the button on which there are no filament supports.

For molding the glass rod and also for heating it in more than one position, which will increase the speed, according to the invention, a turret is provided that rotates intermittently. This turret has a number of glass rod holders distributed regularly over its circumference. During the intervals, the holders are either in a position for the inserting or taking out of the glass rods, in one or more positions for the heating, or in one or more positions for the molding of one or more buttons on the glass rods, and in the central inserting position of the machine. In this device the glass rods must be centered very accurately in order to prevent the expanded part of the rod from touching the edge of the mold. For this purpose the invention provides a mold which in one of the positions of the turret makes a conical end on the heated part of the rod. When now, according to the invention the mold in the inserting position also has a conical recess it will be easy to bring the glass rod in the right position. In order to assure that the mold at the inserting position is properly positioned, the holders for the glass rods are, in accordance with the invention, moved vertically one or more times during one complete rotation of the holders. This can be done by providing the holders with rollers or similar devices, that are controlled by a fixed horizontal guide and one or more adjoining adjustable, vertically movable guides.

The holders have to be open during part of the period in the inserting and taking out position. In order to operate the machine easily, however, it is important that the holder is opened only after the rotation of the turret has stopped, and that it is closed again before the rotation is started. According to the invention, a device is provided which mechanically opens and closes the holders during the time the turret does not rotate.

The invention will be explained with reference to the attached drawing. This drawing shows, as an example of one form of machine embodying the invention a machine having five single and five double mechanisms for the shaping of the supports and five single and five double pairs of fingers for the picking up of the supports. Thus, this machine can insert simultaneously at the most, fifteen supports.

Fig. 1 shows a plan partly in cross-section; and

Fig. 2 shows a vertical cross-section of the machine;

Fig. 3 shows a horizontal cross-section along the line III—III in Fig. 2, in which the turret for rotating the glass rod holders is shown;

Fig. 4 shows a horizontal cross-section along the line IV—IV in Fig. 2;

Fig. 5 shows a horizontal cross-section along the line V—V in Fig. 2;

Fig. 6 shows a vertical cross-section; and

Fig. 7 shows a plan of a wire-guide mechanism;

Fig. 8 shows a vertical cross-section of the drive of the wire guide mechanism;

Fig. 9 shows a plan, partly in cross-section, of a part of this drive;

Fig. 10 shows a cross-section of the "eye" shaping mechanism, and also a view of the cutting mechanism;

Fig. 11 shows a plan on a larger scale of the part of the "eye" shaping mechanism;

Fig. 12 shows a cross-section through a pair of fingers for the picking up of the eye-supports;

Fig. 13 shows a view of a part of a double set of fingers for picking up of the eye-supports;

Figs. 14, 15 and 16 are cross-sections of the molds that are placed near the turret for the purpose of molding the glass rods in three different positions;

Figs. 17 and 18 show two forms of anchors with different forms of eyes, one of which is circular and the other spiral.

The various parts of the machine are mounted on a table 19, on which there are a number of anchor shaping devices A, a number of anchor transferring and inserting devices B for carrying the anchors to a common point where they are inserted, and a rotatable turret C for carrying the glass rods of the mounts.

The machine is driven from a motor belted to a worm wheel speed reduction gear 20 which drives through spur gearing the cam shaft 21 mounted in a bracket 22 on the table 19.

The anchor shaping mechanism A for making the eye supports consists of wire feed mechanism, and wire bending and cutting mechanism for shaping the eyes and then cutting the wire to complete the anchor. Two feed rolls 23 (Figs. 6 and 7) for feeding the wire are journaled in a pedestal on the table 19 and are attached to meshing gears 24 to insure that the feed rolls of all the anchor shaping mechanisms are driven at the same speed. One of the feed rolls is mounted on a driving shaft 25, to one end of which the sprocket wheel 26 (Figs. 1, 2 and 6) is attached. The other end of the drive shaft 25 is journaled in a pivoted arm 27 movable about a pivot 28 and rigidly attached to the pedestal 29 of the wire feeding mechanism. Arm 27 is kept by means of a spring 31 in a position in which the gears 24 are in mesh. The sprocket wheels 26 of all of the anchor shaping mechanisms A are driven by means of a chain 32 (Figs. 1, 2 and 8) from a sprocket wheel 33 mounted on a shaft 34 which rotates in a pedestal 35 attached to the table 19.

The sprocket wheel 33 is driven intermittently and always in the same direction through a one way clutch, such as that shown in Fig. 8, comprising two coupling discs 36 and 37 mounted side by side and, one above the other, and both keyed to the shaft 34 by means of the key 51 (Fig. 9). The coupling discs have a number of recesses in the rim with eccentric bottoms 38 on which clutch rollers 39 ride. The clutch rollers of the upper coupling disc 36 run along the inner rim of a cylindrical cup 40 rigidly attached to the pedestal 35, and the clutch rollers of the lower coupling disc run along the inner rim of a cup 41 (Fig. 8) which oscillates about the shaft 34. The cup 41 is rigidly fastened to a lever 42 to which the driving link 43 (Figs. 1 and 8) is connected. This link 43 is pinned to a bell crank lever 44 which moves about a shaft 45, and carries a roller 46 (Fig. 2) which is moved by a cam 47 on the main cam shaft 21 against the tension of a spring 227. The coupling disks 36 and 37 are intermittently actuated, for rollers 39 are forced into contact with the disk 37 and the rim of the cylindrical cup 41 only in one direction of rotation. To make sure that the rollers are quickly forced between the disk and the cup a number of small buffers 48 (Fig. 9) are provided. They work in slots 49 and are pressed with a little force against the rollers by means of springs 50.

By means of these two couplings the shaft 34 is moved by the oscillating cup 41 in only one direction of rotation of lever 44. In the opposite direction of rotation of the lever 44 the shaft 34 is stopped by the stationary cup 40, so that sprocket wheel 33 rotates intermittently and in one direction only.

The chain 32 is tightened by an idler 52 which is set in an oblong slot 228 of the table 19.

The wire fed to the anchor shaping mechanism A is supplied from spools 53 (Figs. 1 and 2) rotatably mounted on an arm 153. It runs through a guide 54 (Figs. 6 and 7) fastened on pedestal 29. A double anchor shaping mechanism has two spools 53 and the guide 54 has two holes, as shown in Fig. 6, which shows some details of a double mechanism. Instead of guide 54, a device for cleaning the wire can be provided as, for instance, two small pieces of felt that are pressed together. The wire is also fed to another guide 55 by the feed rolls 23. The outer end 56 of the guide 55 may be used as a cutting blade which cooperates with a knife 57. Another guide 58 best shown in Fig. 7 is supplied between this cutting blade and the eye-shaping mechanism. It may be suspended on springs in a case 59 which is bolted at 60 (Fig. 10) to pedestal 29. With the double mechanism the guide 58 has two grooves 61 (Fig. 7) and at the same time guide 55 and the cutting blade 56 have two separate holes for the wires (Figs. 6 and 7). One single pair of feed rolls, however, will suffice for feeding the wires in a double mechanism.

The eye-shaping or loop bending mechanism (Figs. 10 and 11) comprises a small bending roll or sleeve 62 from the end face of which projects a bending lug 63 which gives to the end face of the sleeve 62 the shape of a spiral. Inside of this small sleeve there is a reciprocating pin or mandrel 64 with a point 65, and preferably movable along its own axis inside of the sleeve 62 to produce relative movement of the mandrel and the loop on it to free the loop from the mandrel. A tubular shaft 66 mounted co-axially with the sleeve 62 rotates in a journal 98 which is attached to a projecting arm 99 of a pedestal 71. Tubular shaft 66 and sleeve 62 can be fastened together by means of a set screw 67. A bevel gear 68 is attached to the tubular shaft 66, and meshes with a bevel gear 69 on shaft 70, rotatably mounted in a pedestal 71, which is set in an oblong slot 229 (Figs. 1 and 2) in the table 19. Attached to the shaft 70 is a sprocket wheel 72 over which runs the chain 73 which drives the sprocket wheels 72 of all the eye-shaping mechanisms simultaneously. The chain 73 is tightened by an idler 225 (Fig. 1) which rotates around an adjustable pin that is attached to the table. The chain 73 is driven by a sprocket wheel 74 that is keyed on a shaft 75 which rotates in a journal 76 attached to a pedestal 77 bolted to the table 19 (Fig. 2).

The sprocket wheel 74 for driving the eye shaping mechanism may be driven in either direction from the shaft 75 to which is attached a pinion 78 that meshes with a rack 79 on the end of a rod 80 (Fig. 1). This rod is attached to a frame 81 (Fig. 4) on the inside of which there is a guide 82 over which moves the sliding block 83. This sliding block rests on a flange of the journal 76 and serves the purpose of keeping the rack 79 and the pinion 78 in mesh. The rod 80 is connected to a lever 84 (Figs. 1 and 2) which is fastened to a bushing 85 of countershaft 45. The cam followers 86 and 87 fastened to the bushing 85 and provided with rollers 88 and 89 are actuated by cams 90 and 91 on the main cam shaft 21. Thus the sprocket wheel 74 may be forced to move in one direction by the cam 90 and in the opposite direction by the cam 91, these movements being imparted to the sleeves 62 with their bending lugs 63.

The pin 64 in the sleeve 62 is held in a pin holder 93 by a set screw 92 (Fig. 10). The pin holder 93 can move in the tubular shaft 66 and a spring 94 which is placed between a flange 95 on the pin holder 93, and a flange on the tubular shaft 66 returns the pin holder 93 with the pin 64 to its retracted position, when pin holder 93 is released by a lever 97 (Fig. 1). The links 100 tie together, the levers 97 of the various eye-shaping mechanisms and they are pressed against the heads 95 of the pin holders 93 by means of a spring 101 so that springs 94 are compressed. The links 100 are actuated by a cam 102 (Fig. 2) on main cam shaft 21. This cam moves a roller 103 which is attached to the end of follower 104. This follower is pivoted on a pin 105 which is mounted on table 19. The other arm of the follower is hinged to a link 107 by means of a long pin 106 which moves an off-set 108 of one of the levers 97. Thus, the levers 97 are moved simultaneously by means of the links 100. The rods 109 (Fig. 1) that are attached to some of the links 100 are also taken along. They serve the purpose of moving the second pin in a double mechanism for the manufacture of "eye-supports". Links 100 (shown in Fig. 6) have holes 110 (see Figs. 6 and 7) through which pass pins 111. Each of the pins 111 is attached to a head 112 fixed to one end of a shaft 113, which rotates in a journal 114 fastened to the feed roller pedestal 29. The other end of the shaft 113 actuates the cutting mechanism. When the links are moved the shafts 113 are positively rotated and driven in one direction, the spring 101 rotating them in the opposite direction. An arm 115 is attached to the shaft 113 (Fig. 10) and the knife 57 is hinged to it. The knife is guided by a stud 116 set in a slot 117 that serves the purpose of a guide. The rotation of shaft 113 causes the knife 57 to cut the wires that project out of the cutting edge 56 of the guide 55, and in this way the mechanism for cutting the supports is coupled with the mechanism for moving the reciprocating pin 64. This coupling is important, for in this way it is easy to time both operations correctly.

Pedestal 29 carries a guide finger 164, the end of which (Fig. 11) is placed in the path of the end of the wire in order to guide it correctly into place adjoining the end face of the sleeve 62 and between the lug 63 and the mandrel.

A transfer mechanism for picking up the eye-supports and carrying them to the inserting position has pick up fingers actuated by a gear 118 which is mounted on a centrally located shaft 128 (Figs. 1 and 2). This gear is driven by means of a rod 119 that is attached to it by a wrist pin. This rod 119 is hinged on a lever 120 with three arms and mounted on a pivot 45. The arms 121 and 122 of this lever carry rollers 123 and 124, which are moved by cams 125 and 126 on the main cam shaft 21 to rotate sprocket wheel 118 in either direction. This sprocket wheel drives the pinions 127 (see also Fig. 4) which are fixed on shafts 130. Those shafts rotate in pedestals 129 that are mounted on the table 19. The upper end of each shaft carries a bevel gear 131 (Fig. 12) which drives another bevel gear 132. This latter is bolted to a sleeve 133 by a bolt 134. The sleeve 133 rotates around shaft 135 which is supported by two projecting sides 136 of the pedestal 129. On one side of the bevel gear 132 the teeth are omitted and two arms 137 are screwed on to it. These arms support on their free ends a small wedge 138 which serves the purpose of opening and closing the pick up fingers. A hub 139, to which a tubular swinging arm 140 is attached, can rotate around bushing 133. Inside of this tubular swinging arm 140 a small block 141 is placed. A spring 142 is placed between this block 141 and a plate 143 which is attached to the swinging arm 140. Thus, the small block 141 is pressed against the sleeve 133 and when this sleeve rotates the arm 140 is carried along by friction. The pick up fingers 145 and 146 are bolted to a small block 144 that is fastened to the arm 140. A double mechanism has two pick up fingers 146. As shown in Fig. 13, fingers 146 are springs, much thinner than finger 145. Finger 145 is non-flexible while fingers 146 are pressed against it by their own elasticity. By this means the eye-supports are placed more accurately at the inserting position.

On both sides of the pedestal 129 of the transfer mechanism, are adjustable stops 147 and 148 (see Fig. 2) in the path of a projecting part of swinging arm 140. When the shaft 130 rotates, the swinging arm 140 and the fingers that are attached to it will be stopped by the stops 147 and 148 after a part of a revolution, while the wedge 138 will be turned further causing the fingers either to close or to open. A double pair of fingers (Fig. 13) has a non-flexible finger 145 with a trapezoidal jaw mounted to bring its edge into alignment with the partition between the grooves 61 of guide 58 (Fig. 7). Thus the anchors are fed from the guides ito place on each side of the trapezoidal jaw and in position to be gripped by the fingers, which place them radially at the common inserting point.

The operation of this eye shaping mechanism and the fingers that pick up the anchors and carry them over to the inserting point is as follows: At the moment the feed rollers 23 are actuated by the clutch or coupling discs 37 of the roller clutch thus feeding the wire out of which the anchors are to be made, the pin 64 of the eye forming mechanism is in the retracted position. At the same time the sleeve 62 is in such a position that the end of the wire lies across the inner end of the flat surface of the bending lug 63. After having passed over the bending lug 63 the end of the wire is deflected by the plate 164 out of its straight path and the wire is pressed against the end of the sleeve 62 (see also Fig. 11). The bending lug 63 extends a little beyond this end of the sleeve 62, causing the wire to be caught between this end, the bending lug 63, and the pin 64, when the latter is moved forward. The plate 164 prevents the wire from being pushed away from the bending lug 63 and off the end of the sleeve 62 when the pin comes forward.

During the movement of the wire the fingers 145 and 146 are open and move toward the eye shaping mechanism where they arrive at the moment the wire has been moved forward to the extent necessary to supply the length required to make one anchor. The fingers, still open, come into place to seize the wire and push the guide 58 a little to one side and down into the case 59 (see Fig. 6).

Then the movement of the fingers is checked as the swinging arms 140 are stopped by the stops 147, but the bevel gears 132 rotate a little further, thus moving the wedges 138 further from between the fingers, and thereby permitting the fingers to close and seize the wire.

The end of sleeve 62 is moved by a slight rotation of the sleeve a little toward the end of the wire. When now the bending lugs 63 are actuated (Fig. 10) they are underneath that part of the wire which is held by the feed rolls and the fingers, because the end of the wire is kept in an inclined position by the bending lug 63, the pin 64, and the end of the sleeve 62 (Fig. 11). Thus the spiral anchor eye (Fig. 18) is made which is better suited for mounting the filament than the circular anchor eye shown in Fig. 17. The cams 90 and 91 rotate the bending lug 63 about 30 degrees further than the end of the finished anchor eye is bent, then rotate it back over this same small angle, giving the eye of the anchor the opportunity to expand. This is important in order that the filament supports may be picked up in the right position, then the anchors are cut off from the rest of the wire by the knives 57, and the fingers 145 and 146 carry them to the central inserting position, so that the freshly cut ends are inserted or embedded in the soft button on the glass rod. Upon reaching that position the swinging arms 140 are stopped by the stops 148, but the wedges 138 are rotated a little further causing the fingers to open. The anchors, however, are by that time already inserted in the fused and plastic hot button of the glass rod.

The glass rods are carried by the turret 8, which rotates upon a vertical shaft 149 (Figs. 2 and 3) with a conical head 150, into the positions where they are heated and worked. This head carries a wheel 151, the rim of which is provided with six posts 152. These posts carry on their lower ends a ring 154 and at the same time act as guides for the clamps 155 (Fig. 3) which holds the glass rods and are vertically movable on the turret. The wheel 151 and the ring 154 are also provided with guide sockets 156 and 157 for sliding bars 158 which are vertically movable and are secured to the clamps 155 for the glass rods. The turret is driven from the main cam shaft 21 by means of a sprocket wheel 159 over which runs a chain 160. The chain is stretched by the idler 161 and drives the sprocket wheel 162 which is attached to the shaft 163, which rotates in journals 165 and 166 attached to a frame 167 of the driving mechanism of the turret. This frame 167 is bolted to the table 19 by means of three heavy bolts 168. The turret is driven step by step by intermittent gearing having a driven member 169 in the shape of a Maltese cross and the driving pin 170 fixed between two discs 171 keyed to the shaft 163 (Fig. 5). There is also a locking disc 172 between the discs 171. As the machine shown has a six position turret for working the glass rods the Maltese cross driven member has six arms, as it drives the turret direct. After every complete step of manufacture the turret is turned one-sixth of a circle.

The six different positions (Fig. 3) of each clamp during a complete revolution of the turret are designated by Roman numerals as follows: Position I is where the glass rods are inserted and take out; position II where the rod is heated locally and also partly molded; position III where it is heated still more; position IV where the filament supports are inserted and the top button is moulded; position V where the rod is heated and the bottom button is moulded and position VI where the glass rod is cooled off.

The glass rods are held by the clamps 155 (Fig. 3) each of which has a fixed jaw 173 on a bar which slides on the posts 152 and 158. The movable jaw 174 rotates about the post 158. A spring 175 keeps the jaws of the clamps together. The movable jaw of the clamp has an arm 176 the purpose of which is hereinafter described.

The movable jaws of the clamps are controlled by a mechanism comprising a shaft 163 (Fig. 5) which carries a gear 177 that meshes with a gear 178 on countershaft 179. A cam 180 is mounted on this countershaft and moves roller 181 at the end of a follower 182 (Fig. 4), which is fixed by a screw 183 (Fig. 2) on a sleeve 184. A lever 185 is attached to sleeve 184 has a forked end which catches a pin 186 (Fig. 4) on an arm 187. This arm is attached to a shaft 188 which rotates in a pedestal 189 (Fig. 2) which is bolted to base plate 1. The other end of shaft 188 carries a second arm 190 which catches a pin 191, which is placed in a sleeve 192 (Fig. 2) rotatable about a tube 193 on shaft 149 of the turret. On top of the sleeve 192 there is a catch 194 (Fig. 3) that is pressed outward by a spring. When the clamps rotate around the shaft of the turret (in the direction of the arrow in Fig. 3), the arms 176 of the movable jaws 174 of the clamps will move the catch inward. If, however, the clamps do not rotate and the sleeve 192 is rotated by means of the transmission heretofore described by the cam 180 (in the direction of the arrow in Fig. 3), then the catch will push the arms 176 of the movable jaw 174 and thus open the clamp 155. To lower the glass rod at the anchor inserting position IV and then raise it again by the time it reaches the next position V, an automatic clamp lowering and raising mechanism is provided which controls the vertical position of the clamps. The vertically sliding bar of each clamp 155 is provided with a pin 195 on which is a ball bearing roller 196 guided by a fixed guide 197 mounted on the upper end of the tube 193 and by a vertically movable guide 198 secured to the upper end of a rod 199 which moves up and down in a support 200. The lower end of this rod has a rack 201 in mesh with a segment of a gear 202 on the end of a lever 203 pivoted on a pin 204 and having a roller 205 (Fig. 4), which is moved by a cam 206 on shaft 168. The free end of the lever 203 is connected to a spring 207 which is attached to a pin 208 on base plate 19. When the roller 203 is released by the cam 206 the guide 198 will be pulled down by spring 207.

A button mold 210 (see Fig. 14) with a conical recess in its bottom is provided in position II. It is adjustable on a rod 211 which is pushed down by a spring 212 (Fig. 2) until stopped by a collar 213 encountering the frame 167. The rod 211 is moved upward by a lever 214 (Fig. 5) on the end of which a rod 215 is hinged to move vertically. The wedge-shaped end 216 (Fig. 2) of this rod is moved by a cam 217 on shaft 179. Burners 209 (Fig. 1) are provided in position II. They heat the glass rod at the end at the place where the bottom button is to be pressed. When the mould 210 moves upward the button will be formed at the place where the filament supports are to be inserted while the end of the glass rod will become conical in shape.

In position III a number of burners 218 heat the glass rod at the place where the filament supports are to be inserted. Then the heated rod is carried to position IV which is at the same time the central inserting position of the machine. In this position the movable guide 198 and also the roller 196 of the clamp which is above this guide will be moved down, thus lowering the clamp and pressing glass rod into an anchor inserting mould 219. The bottom end of this mould (see Fig. 15) is conical. Therefore, the conical end of the glass rod that was formed in position II centers the glass rod in mould 219. The circumference of this mould 219 has a number of deep radial grooves in which the fingers 145 and 146 place the filament anchors. The grooves are so narrow that the heated glass does not run into them when it is pressed. At the moment when the glass rod reaches the mould 219 the fingers 145 and 146 have reached the central inserting position, and placed the anchors in the grooves of the anchor inserting mould 219 with the straight ends projecting into the cavity of the mould in position to be embedded in the heated glass button when it is pressed down into the mould by pressure on the top button. The wedges 138 are moved a little further thus causing the fingers 145 and 146 to open and release the inserted anchors.

The cam 206 then moves the glass rod up again into position V of the turret. In this position the outer end of the glass rod is heated until quite soft, after which a lever 220 pivoted on a pin 222 and actuated by a cam 221 causes another lever 223 to rise against the pressure of the spring 224. On this lever a mould 225 is adjustably mounted and has a rough surface which engages the soft glass, thereby roughening it. This rough surface on the end of the glass rod is of advantage when the getter is applied.

In position VI the glass rods cool off.

It will be understood that the invention is not restricted to the form here described and shown, but that there can be many variations in the construction which are within the scope of the invention.

What we claim as new and desire to secure by Letters Patent of the United States, is,—

1. In a device of the character described, the combination with a heater and a holder for holding a glass rod within range of said heater, of an anchor shaping mechanism immovably set at a predetermined distance from said holder, transfer mechanism bodily movable to and fro between said anchor shaping mechanism and said holder for removing an anchor bodily from said shaping mechanism and placing it with its end adjoining the heated portion of the glass rod in said holder, and common actuating means for said mechanisms.

2. In a device of the character described, the combination with a heater and a holder for holding a glass rod within range of said heater, of a shaping mechanism spaced away from said holder for making an anchor with a straight inner end, transfer mechanism mounted between said shaping mechanism and said holder and movable from one to the other for removing an anchor bodily from said shaping mechanism and placing it with its inner end adjoining the heated portion of said rod, and common actuating means for said mechanisms.

3. In a device of the character described, the combination with a heater and a holder for holding a glass rod within range of said heater, of a plurality of anchor shaping mechanisms symmetrically arranged about said holder as a center and spaced away from it, and a plurality of transfer mechanisms between said shaping mechanisms and said holder and radially movable toward said holder for simultaneously removing the anchors from said shaping mechanisms and placing them with their inner ends adjoining the softened portion of said rod.

4. In a device of the character described, the combination with a heater and a holder for holding a glass rod within range of said heater, of a plurality of anchor shaping mechanisms radially located about said holder at a uniform distance from it, and a plurality of transfer mechanisms mounted between said holder and said shaping mechanisms and radially movable from said shaping mechanisms to said holder for bodily removing the anchors from said shaping mechanisms and placing them with their inner ends adjoining said rod, and common actuating means for said mechanisms.

5. In a device of the character described, the combination with a heater and a holder for holding a glass rod within range of said heater, of an anchor shaping mechanism set away from said holder and comprising a wire feed for feeding a wire longitudinally from a spool and a cutter for said wire, a transfer mechanism between said shaping mechanism and said holder and movable from said shaping mechanism to said holder for picking up the cut-off portion of the wire and carrying it into position to adjoin the heated portion of the rod in said holder and embed the freshly cut end of the wire in the rod, and common actuating means for actuating said wire feed, said cutter and said transfer mechanism in sequence.

6. In a device of the character described, the combination with a heater and a holder for holding a glass rod within range of said heater, of an anchor shaping mechanism, and a transfer mechanism mounted between said shaping mechanisms and said holder and comprising cooperating fingers pivoted to swing away from said shaping mechanism to carry the anchor in said shaping mechanism to said holder to adjoin the heated portion of said glass rod in said glass holder.

7. In a device of the character described, the combination with a heater and a holder for holding a glass rod within range of said heater, of an anchor shaping mechanism, and pairs of cooperating fingers mounted between said shaping mechanisms, and said holder and pivoted to swing in vertical planes radial to the rod in said holder, and means for actuating said shaping mechanism and said fingers in sequence to transfer an anchor from said shaping mechanism into position with its end adjoining the glass rod in said holder.

8. In a device of the character described, the combination with a heater and a holder for holding a glass rod within range of said heater, of an anchor shaping mechanism fixed near said holder, and a transfer mechanism comprising a swinging arm mounted on a pivot between said shaping mechanism and said holder and a set of cooperating fingers adjustably secured to said arm to pick up an anchor in said shaping mechanism, and means for actuating said shaping mechanism and said transfer mechanism to swing said arm to bodily remove an anchor from said shaping mechanism and embed one end of it in the rod in said holder.

9. In a device of the character described, the combination with a heater and a holder for holding a glass rod within range of said heater, of an anchor shaping mechanism, a transfer mechanism mounted between said shaping mechanism and said holder comprising resilient fingers mounted to oscillate to and fro between said shaping mechanism and said holder and normally closed and means for opening them, and driving means for actuating said shaping mechanism and said transfer mechanism to cause said fingers to pick up an anchor from said shaping mechanism and move it to bring its end adjoining said glass rod.

10. In a device of the character described, the combination with a heater and a holder for holding a glass rod within range of said heater, of an anchor shaping mechanism, a transfer mechanism for removing the anchor from said shaping mechanism comprising a rigid finger provided with a jaw and cooperating spring fingers on opposite sides of said jaw for clamping two anchors to opposite sides of said jaw, and means for moving said fingers to carry the two anchors bodily from the shaping mechanism into position radially of and adjoining the rod in said holder.

11. In a device of the character described, the combination with a heater and a holder for holding a glass rod within range of said heater, of an anchor shaping mechanism, a transfer mechanism comprising a pair of cooperating normally closed resilient fingers, a wedge mounted in position to spread said fingers, and means for moving said fingers and said wedge to cause said fingers to pick up an anchor in said shaping mechanism and carry it bodily into position to adjoin the rod in said holder.

12. In a device of the character described, a transfer mechanism comprising a shaft, a swinging arm frictionally mounted on said shaft, resilient cooperating fingers on said swinging arm and normally in contact, a wedge rigidly secured to said shaft in position to separate said fingers and means for actuating said shaft to cause said fingers to open and close and to move bodily with said arm.

13. In a device of the character described, a transfer mechanism comprising a shaft, a swinging arm frictionally mounted on said shaft, cooperating fingers secured to said swinging arm, a wedge rigidly attached to said shaft to separate said fingers, and a stop in the path of said arm in position to restrain said arm and cause relative movement of said shaft and wedge during further rotation of said shaft in the same direction.

14. In a device of the character described the combination of anchor transfer mechanism for seizing and positioning a shaped anchor, and anchor shaping mechanism comprising wire feed devices for moving a wire periodically, a bending device for bending the wire near the end, a wire cutter between said wire feed and said bending device, and a grooved guide for the wire resiliently mounted between said cutter and said bending device to be movable away from the path of the wire.

15. In a device of the character described, the combination of anchor transfer mechanism for seizing and positioning a shaped anchor, and an anchor shaping mechanism comprising a wire feed device for feeding a wire, a bending device comprising a roll having a bending lug projecting from the face thereof, and mounted to rotate about an axis transverse to the path of the wire delivered by said wire feed device and a reciprocating pin mounted coaxially of said roll to normally project from the end thereof adjacent to the path of said wire, and means for actuating said roll and reciprocating said pin.

16. In a device of the character described the combination of an anchor transfer mechanism for seizing and positioning a shaped anchor, and an anchor shaping mechanism comprising a wire feed device, a bending roll with its end face shaped to engage a wire adjoining it and positioned adjacent the path of the wire delivered by said wire feed, a pin mounted coaxially of said roll to reciprocate longitudinally thereof and to project from the end face of said roll, and a stationary guide mounted adjacent the end face of said roll in the path of the wire delivered by said wire feed device.

17. In a device of the character described, the combination of an anchor transfer mechanism for seizing and positioning a shaped anchor, and an anchor shaping mechanism comprising a wire feed device, a cutter adjacent the wire feed device, a wire bending mechanism comprising a bending roll having a bending lug projecting from its end face and eccentric thereto, said roll being mounted to rotate about an axis transverse the wire fed by said device and having a reciprocating pin coaxially mounted therein, and common driving means for said wire feed device, said cutter and said bending mechanism.

18. In a device of the character described, the combination of an anchor transfer mechanism for seizing and positioning a shaped anchor, and an anchor shaping mechanism comprising a bending roll having an end shaped to bend a wire into a loop, a reciprocating pin mounted coaxially of said roll, and driving mechanism for rotating said roll to pin a wire around said bend and then rotating said roll backwards through an angle at least equal to the angle through which the end of the bent wire will spring back due to its elasticity.

19. In a device of the character described, the combination of anchor making and positioning mechanisms, a conical inserting mold having radial slots to receive the ends of the anchors placed therein by said mechanisms, a glass rod holder and a conical mold relatively movable to shape the end of a glass rod into a cone, said holder being further movable to carry the molded end of the rod therein into registry with said inserting mold, heaters for softening the end of said rod, and common driving means for actuating said mechanisms and said holder to first mold the end of said rod and then center it while soft in said inserting mold to adjoin the ends of said anchors.

20. In a device of the character described, a turret rotatable about a vertical shaft, a glass rod clamp mounted on said turret to be vertically movable, a fixed horizontal guide track having a gap therein and cooperating with said clamp to hold it at a definite level during its rotation, a vertically movable guide in the gap in said track to control the vertical position of said clamp driving means for intermittently rotating said turret step by step and holding it stationary with said clamp in said vertically movable guide, and means controlled by said driving means for actuating said vertically movable guide to raise and lower said clamp.

21. In a device of the character described, a loop bender comprising a rotatable bending roll having a bending lug projecting from its end face, a mandrel concentric with said roll and projecting from the end face of said roll, a wire feed for feeding a wire endwise into place between said lug and said mandrel and adjoining the end face of said roll, and common actuating means for successively actuating said wire feed, rotating said roll to bend the wire about said mandrel into a loop and producing relative movement of said wire and said mandrel transversely of said wire to free the loop from said mandrel.

22. In a device of the character described the combination with a heater and movable holder for holding a glass rod within range of said heater, of an anchor shaping mechanism, transfer mechanism for removing an anchor bodily from said shaping mechanism and placing it with its end in a predetermined position, mechanism for moving said holder to bring the softened end of a glass rod in said holder adjacent said anchor end and enlarging said end while soft to cause said softened glass to overflow and embed said end of said anchor, and common actuating means for said mechanisms.

23. In a device of the character described, the combination with a heater and movable holder for holding a glass rod within range of said heater, of a plurality of anchor shaping mechanisms mounted about said holder, a plurality of transfer mechanisms for removing anchors bodily from said shaping mechanisms and placing them with the adjacent ends radially positioned about a common center in predetermined relation, mechanism for moving said holder to bring the softened end of a glass rod in said holder to said common center and to cause said end to enlarge and embed the adjacent ends of said positioned anchors, and common actuating means for actuating said mechanisms in sequence.

In witness whereof, we have hereunto set our hands this 10th/12th days of February, A. D. 1925.

HEINRICH MARTIN HUBERT REUFEL.
HENDRIK DE JONG.
WILLEM GUSTAAF FREDERIK WENTINK.

mon center in predetermined relation, mechanism for moving said holder to bring the softened end of a glass rod in said holder to said common center and to cause said end to enlarge and embed the adjacent ends of said positioned anchors, and common actuating means for actuating said mechanisms in sequence.

In witness whereof, we have hereunto set our hands this 10th/12th days of February, A. D. 1925.

HEINRICH MARTIN HUBERT REUFEL.
HENDRIK DE JONG.
WILLEM GUSTAAF FREDERIK WENTINK.

CERTIFICATE OF CORRECTION.

Patent No. 1,801,108.  Granted April 14, 1931, to

HEINRICH MARTIN HUBERT REUFEL ET AL.

It is hereby certified that error appears in the printed specification of the above numbered patent requiring correction as follows: Page 9, line 58, claim 18, for the word "pin" read bend, and in same line, for "bend" read pin; and that the said Letters Patent should be read with these corrections therein that the same may conform to the record of the case in the Patent Office.

Signed and sealed this 26th day of May, A. D. 1931.

M. J. Moore,
Acting Commissioner of Patents.

(Seal)

CERTIFICATE OF CORRECTION.

Patent No. 1,801,108.            Granted April 14, 1931, to

HEINRICH MARTIN HUBERT REUFEL ET AL.

It is hereby certified that error appears in the printed specification of the above numbered patent requiring correction as follows: Page 9, line 58, claim 18, for the word "pin" read bend, and in same line, for "bend" read pin; and that the said Letters Patent should be read with these corrections therein that the same may conform to the record of the case in the Patent Office.

Signed and sealed this 26th day of May, A. D. 1931.

(Seal)

M. J. Moore,
Acting Commissioner of Patents.